United States Patent [19]

Greener et al.

[11] 4,339,158

[45] Jul. 13, 1982

[54] END CAP ASSEMBLIES FOR CONVEYOR ROLLERS

[75] Inventors: Brian Greener, Welwyn Garden City; Simon J. Pedder, Luton, both of England

[73] Assignee: SKF (U.K.) Limited, Bedfordshire, England

[21] Appl. No.: 128,893

[22] Filed: Mar. 10, 1980

[30] Foreign Application Priority Data

Mar. 9, 1979 [GB] United Kingdom ............... 7908393
Dec. 21, 1979 [GB] United Kingdom ............... 7944104

[51] Int. Cl.³ .................... F16C 35/04; F16C 35/12; B65G 13/00
[52] U.S. Cl. ........................ 308/20; 29/119; 193/37; 308/189 R; 308/190
[58] Field of Search ............ 308/20, 26, 187.1, 187.2, 308/189 R, 193, 195, 184 R, DIG. 1, 190, 191, 236, 178; 193/37; 29/110, 119, 121.1

[56] References Cited

U.S. PATENT DOCUMENTS

| | | | |
|---|---|---|---|
| 1,720,255 | 7/1929 | Adams | 308/20 |
| 1,881,896 | 10/1932 | Olson | 308/20 |
| 2,768,725 | 10/1956 | Foulds et al. | 308/20 X |
| 2,779,639 | 1/1957 | Bainbridge | 308/20 X |
| 3,246,357 | 4/1966 | Amimons | 29/119 X |
| 3,255,858 | 6/1966 | Reilly | 193/37 |
| 3,885,840 | 5/1975 | Neder | 308/236 X |
| 3,957,147 | 5/1976 | Specht | 308/20 X |
| 4,017,128 | 4/1977 | Setele et al. | 308/189 R X |
| 4,046,432 | 9/1977 | Hofmann et al. | 308/236 X |

FOREIGN PATENT DOCUMENTS

411476 11/1966 Switzerland ............ 308/20

*Primary Examiner*—Stuart S. Levy
*Attorney, Agent, or Firm*—Browdy and Neimark

[57] ABSTRACT

A conveyor roller comprises a roller tube fitted with end cap assemblies incorporating bearings for rotatably mounting the roller tube on a fixed shaft. Each end cap assembly comprises a rigid housing having a cylindrical collar adapted to be a push fit in an end of the roller tube, the outer end of the collar being spaced radially from the housing. The end cap assembly is secured in position by swaging the end of the tube so as to force the outer end of the collar radially inwards against the rigid housing. The collar may be a close fit on the housing, or the housing may be moulded in plastics material and one end of the collar embedded in the plastics during the moulding of the housing. The outer end of the collar has a flange which abuts the end of the roller tube. The outer surface of the housing is curved radially inwards in the direction of the free end of the collar to limit the deflection of the collar. The separate collar can have a thickness adapted to any particular diameter of roller tube, and may be connected to the housing by welding, adhesive or interengaging teeth or ribs to prevent relative rotation therebetween.

11 Claims, 17 Drawing Figures

END CAP ASSEMBLIES FOR CONVEYOR ROLLERS

This invention relates to conveyor rollers of the kind comprising a roller tube fitted with end cap assemblies incorporating bearings for rotatably mounting the roller tube on a fixed shaft.

It is known to secure end cap assemblies in conveyor roller tubes by swaging the tube onto each end cap assembly, the end cap housing being deformed at the same time as the tube is reduced in diameter by the swaging operation. It is also known to swage steel roller tubes onto end cap assemblies having rigid housings made of plastics material moulded to the final shape which will be taken up by the deformed steel tube. It is however difficult to obtain an acceptable rotational secure fit by swaging a tube down on to such a preformed, rigid, moulded plastics housing, since the steel tube when deformed is subject to a degree of "springback" which reduces or can even remove the force acting between the housing and the steel tube.

The object of the invention is to provide an improved construction of end cap assembly having a rigid housing which can be secured radially in a roller tube by swaging the tube.

According to the invention there is provided an end cap assembly for a roller tube of a conveyor roller, comprising a substantially rigid housing having a resilient collar surrounding the housing, the collar being of a size to be a sliding fit within an end of the roller tube and form a support therefor, and a bearing in said housing for rotatably mounting the assembly on a shaft, wherein the collar is a separate component mounted on the housing and has a portion thereof spaced radially from the housing and movable radially inwards against its own resilient resistance to deformation, whereby the end cap assembly may be firmly secured in an end of the roller tube by positioning the assembly in the tube with the end thereof surrounding said portion of the collar and swaging the end of the tube radially inwards against said portion of the collar.

The housing and the collar can conveniently be moulded in a polymeric material, for example plastics material. Preferably, the housing and the collar are made of different materials particularly adapted to the functions performed by these components, for example the housing may be manufactured from a glass fibre filled nylon to obtain strength and stiffness, while the collar can be manufactured in unfilled nylon to obtain a greater resilience. It would also be feasible to use fire-resistant plastics, which are inherently brittle, for the housing and to use resilient plastics or even spring steel for the collar. The rigid housing could be made of steel or other metal.

The collar may be mounted as a close fit on the housing. Alternatively, the housing and collar may be moulded in a single unit. For example, the housing may comprise a moulding of plastics material, and the collar be made of spring steel or other resilient material, one end portion of the collar being embedded in the housing during the moulding of the latter.

The end cap assembly of the invention has the advantage that, when the roller tube is swaged onto the end cap assembly with the collar forced radially inwards, the collar tends to return to its original position due to its resilience and thereby maintains a force between the end cap assembly and the tube bore should "springback" occur in the tube after the swaging tool has been removed, thus ensuring that the end cap assembly will be firmly secured radially in the tube.

The collar preferably comprises a cylinder formed at one end with an annular flange projecting radially inwards and abutting the corresponding end of the housing, the other end of the collar being formed with an annular flange projecting radially outwards and adapted to abut against the end of the roller tube when the assembly is fitted in the end of the roller tube. The part of the collar adjacent the inwardly projecting flange is preferably a tight fit on the housing, and the housing arranged so that its external surface is curved radially inwards in a direction away from the said one end of the collar, whereby the collar is deflected to the curvature of the external surface of the housing, so as to limit the strain in the collar to a predetermined value, when the end of the roller tube is swaged radially inwards to force the other end of the collar into engagement with the housing.

A further advantage of using a separate collar fitted on the housing is that a standard size of housing can be used for different diameters of rollers, for example by varying the overall thickness of the wall of the collar.

In a case in which the end cap assembly will only be subjected to light loads in service, the frictional resistance against relative rotation between the collar and the housing may be sufficient to transmit the torque therebetween. The collar is however preferably welded to the housing, or secured thereto by adhesive, or coupled thereto by mechanical means. For example the collar and the housing may be provided with teeth or ribs which intermesh to prevent relative rotation between the collar and the housing.

End cap assemblies according to the invention can conveniently be supplied to a user with the collars separate from the housings, so that the user can select a collar of appropriate size to fit a particular diameter of roller tube, and assemble the collar on the housing on site.

To enable the housing and collar to be handled as an assembled unit prior to and during the mounting on the roller tube, the collar can be coupled to the housing by welding, adhesive or mechanical means so as to interconnect the collar and the housing.

Embodiments of the invention will now be described, by way of example, with reference to the accompanying drawings, in which.

Figure 1:
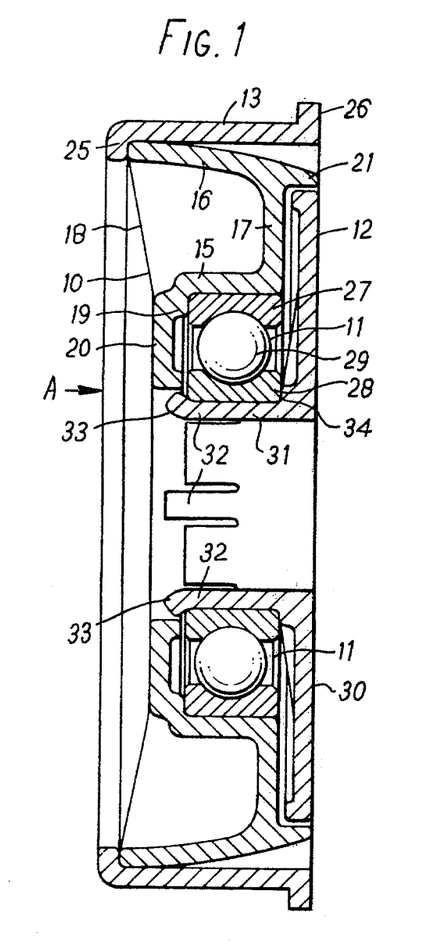
FIG. 1 is a cross-sectional side elevation of one construction of an end cap assembly according to the invention.
Figure 2:
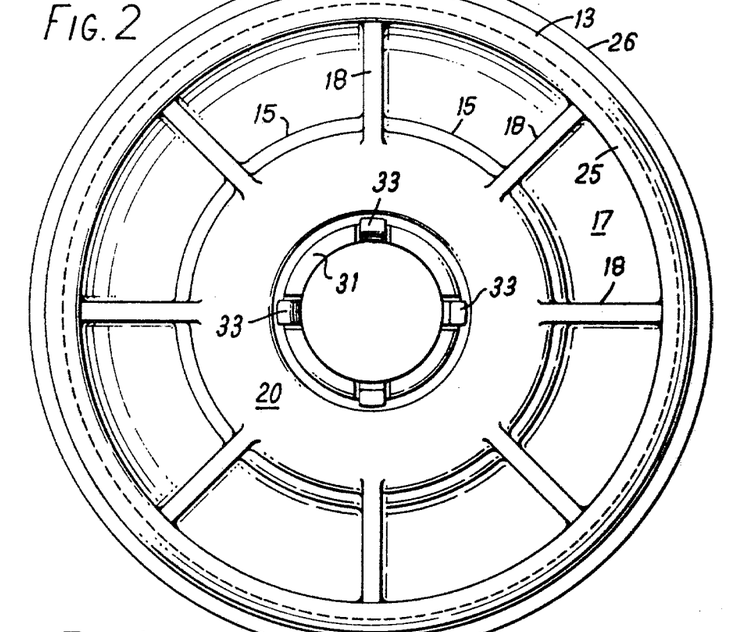
FIG. 2 is an end view of the end cap assembly of FIG. 1, taken in the direction of arrow A in FIG. 1.

The end cap assembly shown in FIGS. 1 and 2 comprises an annular housing 10 fitted with a ball bearing 11, an end cover 12 engaged as a snap fit in the bore of the bearing and a cylindrical collar 13 fitted on and surrounding the housing.

The housing 10 is a substantially rigid structure and comprises a cylindrical inner wall 15, an outer wall 16 surrounding the inner wall, an end wall 17 integral with adjacent ends of the walls 15, 16 and a plurality of radial webs 18 (FIG. 2) spaced around the housing and extending between the inner and outer walls 15, 16, the webs 18 being integral with the walls 15, 16, 17. The end of the inner wall 15 remote from wall 17 is formed with an annular step 19 forming an abutment for the bearing 11, and an end wall 20 integral with the step 19 extends radially inwards as shown in FIG. 1 to form an inner end cover for the bearing. The outer wall 16 of the housing curves radially inwards in the axial direction towards the end wall 17, the outer wall 16 projecting beyond the end wall 17 to form an annular lip 21.

The cylindrical collar 13 is formed at one end with an inwardly projecting radial flange 25 which abuts the larger diameter end of the outer wall 16 of the housing, and the collar is formed at the opposite end with an outwardly projecting radial flange 26. The collar is a tight frictional fit on the larger diameter end of the outer wall of the housing.

The ball bearing 11 comprises an outer bearing ring 27, an inner bearing ring 28 and balls 29 in rolling engagement with groove tracks on the rings 27, 28 so that the bearing is capable of resisting radial forces and axial forces in both directions. The outer ring 27 is a tight fit against the inside surface of the cylindrical wall 15 and abuts against the step 19.

The outer end cover 12 comprises an annular disc 30 formed with a cylindrical flange 31 at the center of the disc. The free end of flange 31 is split axially and formed into four resilient fingers 32 having enlarged ends 33 which extend through the bore of the inner bearing ring 28 and engage as a snap fit on the chamber thereof, and the external surface of the flange 31 is formed with an annular step 34 which abuts the adjacent face of the inner bearing ring when the enlarged ends of the fingers engage the opposite side of the inner bearing ring, thereby axially locating the end cover relative to the bearing and the housing. The disc 30 is spaced close to the end wall 17 and annular lip 21 of the housing so as to provide a narrow tortuous gap forming a labyrinth seal between the housing and the cover.

Figure 3:
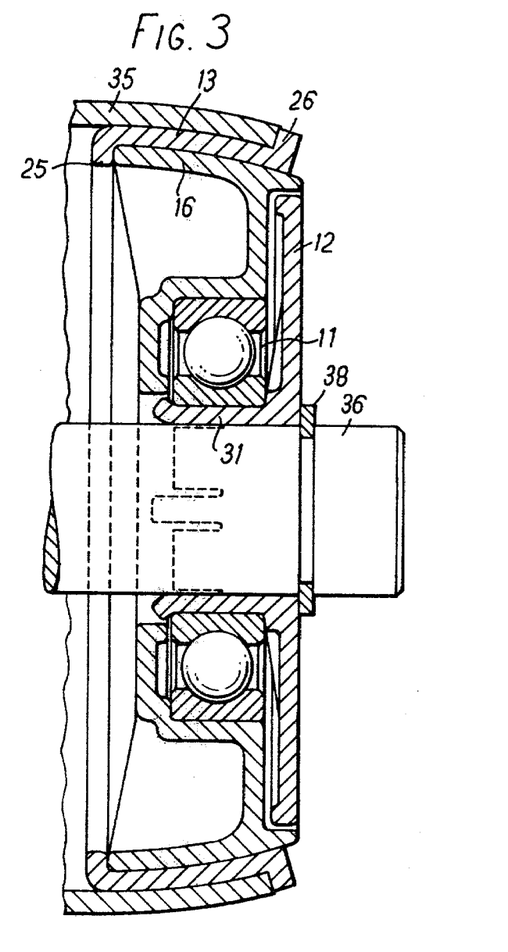
FIG. 3 is a cross sectional side elevation of one end of a conveyor roller incorporating the end cap assembly of FIGS. 1 and 2.

The end cap assembly is designed for use with a cylindrical steel roller tube 35 having an internal diameter such that the collar 13 of the end cap assembly is a hand push fit within the roller tube, the roller tube having an external diameter which is not smaller than that of the flange 26. The end cap assembly is secured in position in the end of the roller tube, with the flange 26 abutting the end of the tube, by swaging the end of the roller tube 35 radially inwards, that is reducing the diameter of the end of the roller tube by external pressure, so as to force the collar 13 against the external surface of the outer wall 16 of the housing, as shown in FIG. 3. The walls 15, 16, 17 and the radial webs 18 form a substantially rigid frame which resists deformation under the swaging pressure applied to the roller tube. The swaging operation is preferably controlled by a pressure transducer designed to prevent the swaging pressure exceeding a predetermined maximum value.

In the swaging operation the end of the roller tube 35 must of course be deformed beyond its elastic limit so as to prevent or reduce "spring-back" of the roller tube. Also, the collar 13 must have a higher degree of elasticity than the metal of the roller tube. The radius of curvature of the outer surface of the wall 16 of the housing is such that, when the collar is forced against the wall 16 substantially along its full length, the strain in the collar 13 does not exceed a predetermined value at any point along its length. Thus, after the swaging operation, the collar 13 acts as a spring which provides and maintains a force between the end cap assembly and the bore of the roller tube should "spring-back" occur in the tube after swaging tool has been removed, thereby ensuring that the end cap assembly is a firm fit within the roller tube. The end cap assembly is of course secured against outward axial movement by the swaged end of the roller tube, and against inward axial movement by engagement of the flange 26 against the end of the roller tube. The external diameter of the end of the roller tube is not less than that of the flange 26, as explained above, to ensure that the swaging tool contacts the steel tube and not the flange 26 during the swaging operation.

The housing 10 is made of a resilient plastics material, for example glass fibre filled nylon, but may however be made of fire resistant plastic. The outer end cover 12 is also made of resilient plastics material, for example unfilled nylon. The collar 13 may be made of spring steel or any other suitable resilient material, but is preferably made of resilient plastics, for example unfilled nylon. In a case in which the collar is made of plastics, the strain in the collar, when fitted in a roller tube, is below the level at which significant creep or relaxation of the plastics will occur in service.

The end cap assembly, fitted in the roller tube, is mounted on a shaft 36 (FIG. 3) for fitting in the frame of a conveyor, the shaft 36 being a close sliding fit in the bore of the cylindrical flange 31 on the outer end cover. The end cap assembly is axially located by a circlip 38 engaged in a groove in the shaft as shown in FIG. 3.

Figure 4:
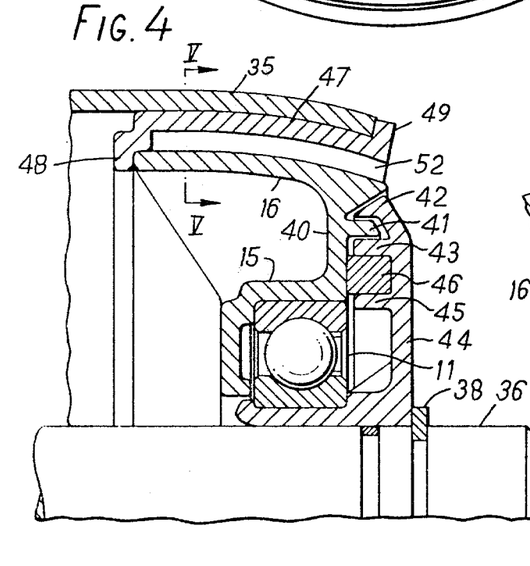
FIG. 4 is a cross sectional side elevation of the upper half of one end of a conveyor roller incorporating another construction of end cap assembly according to the invention.
Figure 5:
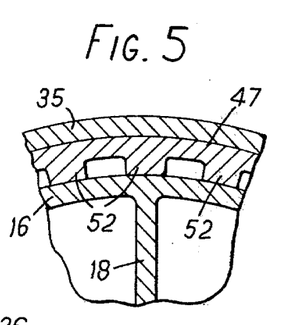
FIG. 5 is a detail view along the line V—V in FIG. 4.

FIGS. 4 and 5 show a modified contruction of the end cap assembly of FIGS. 1-3, fitted in a roller tube 35 swaged on the end cap assembly in accordance with the invention as described above. The end cap assembly of FIGS. 4 and 5 has a housing, a bearing and an outer end cover similar to the corresponding components of the end cap assembly of FIGS. 1-3, and like parts are denoted by like reference numerals, except that the end wall 40 of the housing is formed with an annular tongue 41 which projects between two concentric annular tongues 42, 43 on the outer end cover 44 so as to provide a narrow tortuous gap forming a labyrinth seal between the housing and the end cover. The end cover is also provided with a further annular tongue 45 spaced radially inwards from tongue 43, and a felt seal 46 between the tongues 43, 45 is compressed between the housing and the end cover so as to close off the inner end of the labyrinth seal.

The end cap assembly of FIGS. 4 and 5 comprises a collar 47 mounted as a tight frictional fit on the housing, one end of the collar 47 having a flange 48 abutting the larger diameter end of the outer wall 16 of the housing and the other end of the collar having a flange 49 adapted to abut the end of the roller tube when the end cap assembly is fitted therein. As in the end cap assembly of FIGS. 1-3, the collar 47 is cylindrical before the end cap assembly is inserted into the roller tube and the collar is deformed into contact with the external surface of the wall 16 of the housing along substantially its full length when the roller tube is swaged onto the end cap assembly. The collar 47 however differs from that of the assembly of FIGS. 1-3 in that its internal surface is provided with axially extending ribs 52 so as to provide an increase in its radial section over that provided by the collar 13 of the end cap assembly of FIGS. 1-3. Alternatively the external surface of the collar may be provided with axially extending ribs so as to increase its radial section. The gaps between the ribs 52 on the internal surface of the collar, or between ribs on the external surface of the collar, must however be closed off of at least one end of the collar so that the end cap assembly and shaft close off the end of the roller tube and prevent entry of foreign matter therein.

FIGS. 6-17 show different constructions of end cap assemblies all having a housing, a bearing, and an end cover identical to the corresponding components of the end cap assembly of FIGS. 4 and 5, but with different constructions of collar. The end cap assemblies of FIGS. 6-15 are all shown fitted in position in the end of a roller tube 35 which is swaged to force the collar against the housing, and it is to be understood that in the construction shown in FIGS. 6-15 the collar is substantially cylindrical prior to the swaging operation. In FIGS. 9-15 there is shown only those parts of the housing necessary to illustrate the construction and operation of the spring collar.

Figure 6:
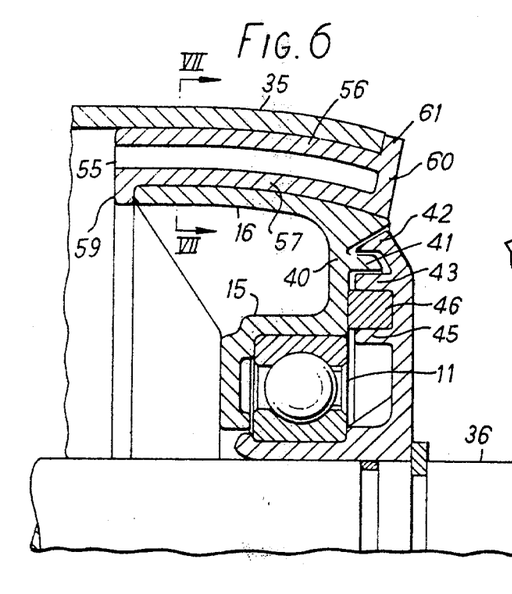
FIG. 6 is a view similar to FIG. 4 showing a further construction of end cap assembly according to the invention.
Figure 7:
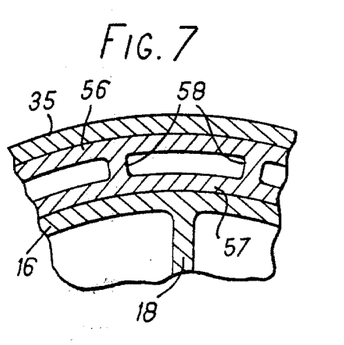
FIG. 7 is a detail view taken along the line VII—VII in FIG. 6.

FIGS. 6 and 7 show an end cap assembly which is particularly suitable for use in a roller tube having a diameter substantially larger than the external diameter of the housing. In this construction the collar 55 comprises an outer wall 56 adapted to be a close sliding fit in the roller tube, an inner wall 57 which is a close frictional fit on the larger diameter end of the housing prior to deformation of the collar, and axially extending webs 58 (FIG. 7) between the two walls 56 57, the inner wall 57 having a flange 59 abutting the larger diameter end of the outer wall 16 of the housing and the other end of the collar having an end wall 60 which closes the space between the two walls 56, 57. The end wall 60 projects radially outwards beyond wall 56 to form a flange 61 which abuts the end of the roller tube when the end cap assembly is fitted therein.

The construction of FIGS. 6 and 7 has the advantage that the sub-assembly comprising the housing, the bearing and the outer end cover may be provided with any selected one of several collars of different external diameter to fit roller tubes of different diameter.

Figure 8:
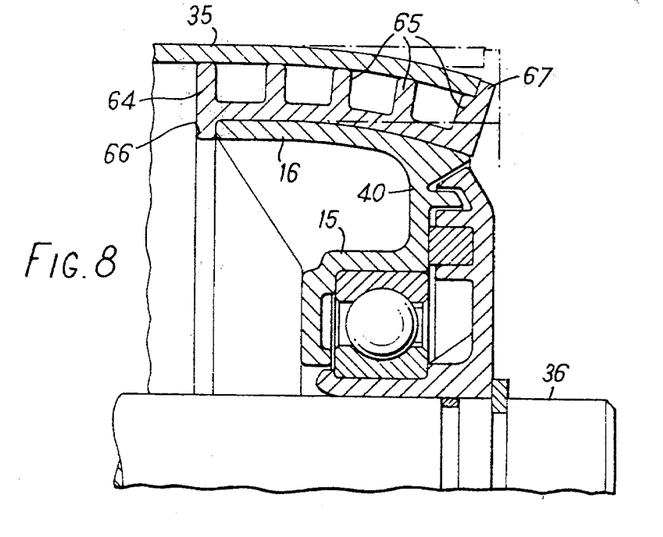
FIG. 8 is a view similar to FIG. 4 showing yet another construction of end cap assembly according to the invention.

FIG. 8 shows an end cap assembly in which the collar 64 is formed externally with a plurality of circumferential ribs 65 which are a close sliding fit in the roller tube prior to the swaging operation. One end of the collar has a flange 66 which abuts the larger diameter end of the wall 16 of the housing and the rib at the other end of the collar has a flange 67 which abuts the end of the roller tube. This construction also has the advantage that a standard size of housing may be fitted with a collar having ribs of a particular diameter to enable the end cap assembly to be fitted in a roller tube of a particular diameter.

In the end cap assemblies shown in FIGS. 1-8 the frictional resistance between the collar and the housing is relied on to prevent relative rotation therebetween during operation of a conveyor roller fitted with the end cap assembly. The collar and housing may however be interlocked, as shown for example in FIGS. 9-15 to prevent relative rotation therebetween.

Figure 9:
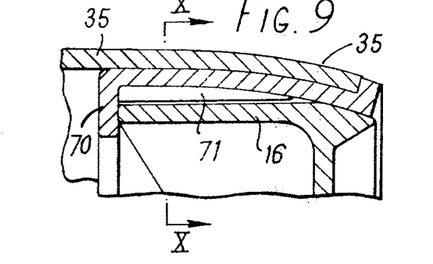
FIG. 9 is a cross sectional view of part of a conveyor roller incorporating a still further contruction of end cap assembly according to the invention.
Figure 10:
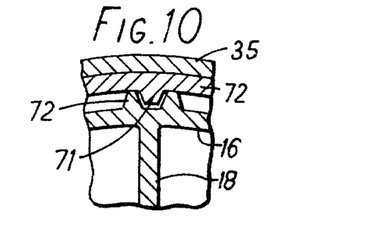
FIG. 10 is a detail view along the line X—X of FIG. 9.
Figure 11:
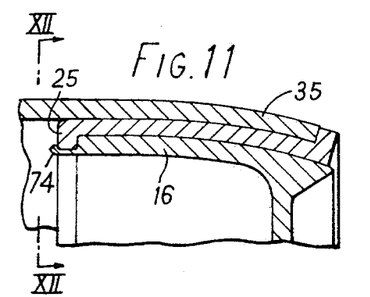
FIG. 11 is a cross sectional view of part of a conveyor roller incorporating another construction of end cap assembly according to the invention.
Figure 12:
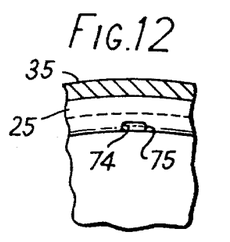
FIG. 12 is a detail view taken along the line XII—XII in FIG. 11, FIGS. 13, 14, 15 are cross sectional views of parts of conveyor rollers incorporating other constructions of end cap assemblies according to the invention.
Figure 13:
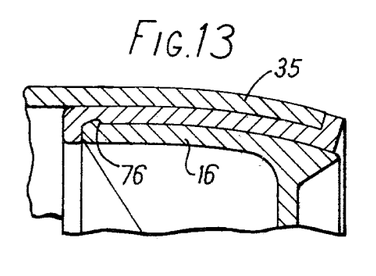
Figure 14:
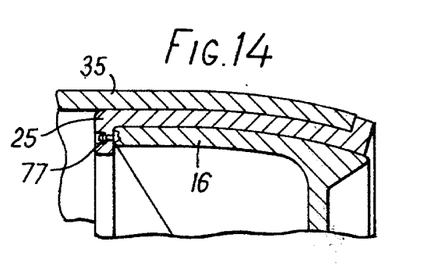
Figure 15:
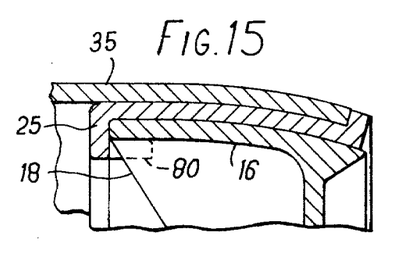

In FIGS. 9 and 10 the collar 70 is provided on its internal surface with axial ribs 71 (only one of which is shown in FIG. 10) which engage between axial ribs 72 formed on the external surface of the housing. In FIGS. 11 and 12 the outer wall of the housing is formed at its axially inner end with tongues 74 (only one of which is shown in FIG. 11) which engage as a snap fit in grooves 75 in the inner periphery of the flange 25 on the collar. In FIG. 13, the outer wall of the housing is formed at its axially inner end with an annular rib 76 which engages in an annular groove in the internal surface of the collar. Alternatively, the internal surface of the collar could be provided with an annular rib which engages in an annular groove in the outer wall of the housing. In FIG. 14 the outer wall of the housing is formed at its axially inner end with pins 77 which engage in apertures in the flange 25 of the collar. The pins 77 have enlarged heads and the apertures have a reduced diameter neck which cooperates with the pins to provide a snap fit of the pins in the apertures. In FIG. 15 the flange 25 on the collar is formed with axially extending teeth 80 which project between the radial webs 18 of the housing to prevent relative rotation between the collar and the housing.

Figure 16:
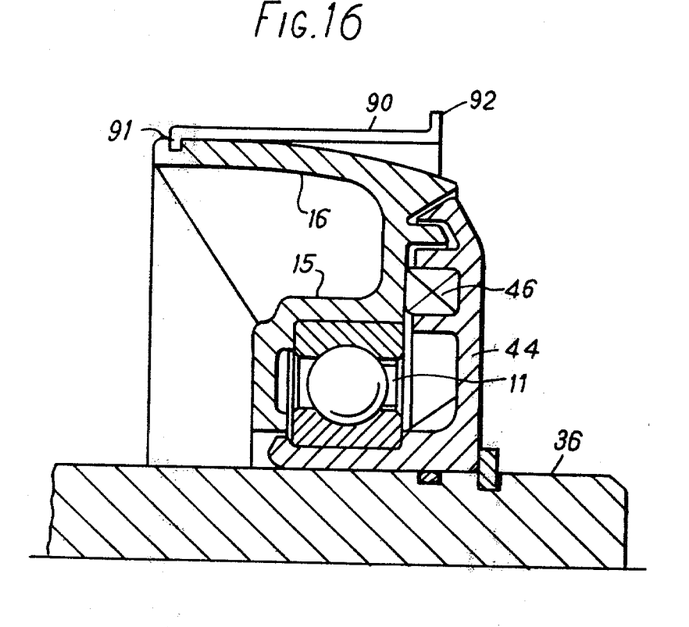
FIG. 16 shows an end cap assembly with a collar having one end thereof embedded in the housing.
Figure 17:
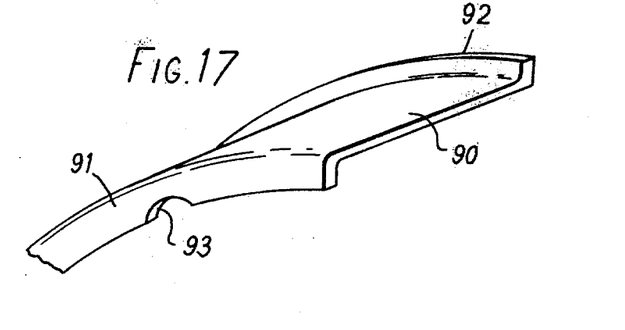
FIG. 17 is a perspective view of part of the collar of the assembly of FIG. 16.

FIG. 16 shows an end cap assembly comprising a housing moulded in plastics material, and a cylindrical collar 90 having an inwardly projecting radial flange 91 at one end and an outwardly projecting radial flange 92 at the opposite end. The housing is similar to that of FIG. 4 and like references denote like parts. The flange 91 of the collar is however embedded in the plastics material of the housing during the moulding of the housing. The flange 91 is formed with a cut-outs 93 (FIG. 17) into which the plastics material flows during the moulding operation and forms keys which prevent relative rotation between the collar and the housing due to torque during operation of a conveyor roller fitted with the assembly. The assembly is fitted into an end of a roller tube by swaging the end of the tube and the collar as in the other embodiments.

We claim:

1. An end cap assembly for a roller tube of a conveyor roller, comprising a substantially rigid annular housing, a collar mounted on and surrounding the housing, the collar being of a size to be a sliding fit within an end of the roller tube and form a support therefor, and a bearing for rotatably mounting the assembly on a shaft, wherein the housing has an axially extending inner wall and an axially extending outer wall, the outer surface of said outer wall being curved radially inwards in an axial direction of the housing over at least part of the length of said outer wall so that the housing has a larger diameter end and a smaller diameter end, the bearing is mounted as a force fit in the bore defined by said inner wall of the housing, and the collar has an inwardly projecting radial flange at one end thereof and an outwardly projecting radial flange at the other end thereof, said collar being mounted as a close fit on said larger diameter end of the housing with the inwardly projecting flange abutting said larger diameter end of the housing and the remainder of the collar spaced radially from said curved outer wall of the housing and movable radially inwards against its own resilient resistance to deformation into abutting contact with said curved outer wall of the housing, whereby the end cap assembly may be firmly secured in an end of the roller tube by positioning the assembly in the tube with the outwardly projecting radial flange abutting the end of the tube and swaging the end of the tube radially inwards so as to force the collar against the housing with at least part of the collar lying along the curved outer surface of the outer wall and deformed to the curvature thereof and the end portion of the roller tube lying along the curved collar and deformed to the curvature thereof.

2. An end cap assembly as claimed in claim 1, wherein the internal surface of the collar is formed with axially extending ribs adapted to engage along substantially the length of the outer wall of the housing when the roller tube is swaged radially inwards to force said remainder of the collar into engagement with the housing.

3. An end cap assembly as claimed in claim 1, wherein the external surface of the housing and the internal surface of the collar are formed with axially extending ribs which interlock so as to prevent relative rotation between the collar and the housing.

4. An end cap assembly as claimed in claim 1, wherein the housing is formed with radial webs between said inner and outer walls and said inwardly projecting flange on the collar is formed with axially extending teeth which project between the webs of the housing and thereby prevent relative rotation between the collar and the housing.

5. An end cap assembly as claimed in claim 1, wherein the collar comprises an outer wall adapted to be a sliding fit within the roller tube, an inner wall which is a close fit on the housing at the larger diameter end thereof, and axially extending webs between the two walls, said inwardly projecting radial flange being formed on the inner wall of the collar at said one end thereof, and said outwardly projecting radial flange being formed on the outer wall of the collar at said other end thereof.

6. An end cap assembly as claimed in claim 1, wherein the external surface of the collar is formed with circumferential ribs adapted to be a close sliding fit within the roller tube, the said outwardly projecting radial flange being formed on the circumferential rib at said other end of the collar.

7. An end cap assembly as claimed in claim 1, wherein one of the two components of the end cap assembly comprising the housing and the collar is formed with an annular groove and the other of said two components is formed with an annular rib engaged in said annular groove.

8. An end cap assembly as claimed in claim 1, wherein one of the two components of the end cap assembly comprising the housing and the collar is formed with apertures and the other of said two components is formed with tongues engaged in said apertures so as to prevent relative rotation between the two components.

9. An end cap assembly as claimed in claim 1, wherein the housing and the collar are made of different materials, with the material of the collar more resilient than that of the housing.

10. An end cap assembly for a roller tube of a conveyor roller, comprising an annular housing made of a fire resistant plastics material, a collar mounted on and surrounding the housing, said collar being made of a material which is more resilient than that of the housing, and said collar being of a size to be a sliding fit within an end of the roller tube and form a support therefor, and a bearing for rotatably mounting the assembly on a shaft, wherein the housing has an axially extending inner wall, an axially extending outer wall, and a plurality of webs spaced around said housing and extending between said inner and outer walls thereof so as to provide a substantially rigid structure to said housing, the outer surface of said outer wall being curved radially inwards in an axial direction of the housing over at least part of the length of said outer wall so that the housing has a larger diameter end and a smaller diameter end, the bearing comprises an outer bearing ring, an inner bearing ring, and rolling elements between the two bearing rings, the outer bearing ring being mounted as a force fit in the bore defined by said inner wall of the housing, and the collar has an inwardly projecting radial flange at one end thereof and an outwardly projecting radial flange at the other end thereof, said collar being mounted as a close fit on said larger diameter end of the housing with the inwardly projecting flange abutting said larger diameter end of the housing and the remainder of the collar spaced radially from said curved outer wall of the housing and movable radially inwards against its own resilient resistance to deformation into abutting contact with said curved outer wall of the housing, whereby the end cap assembly may be firmly secured in an end of the roller tube by positioning the assembly in the tube with the outwardly projecting radial flange abutting the end of the tube and swaging the end of the tube radially inwards so as to force the collar against the rigid housing with at least part of the collar lying along the curved outer surface of the outer wall and deformed to the curvature thereof and the end portion of the roller tube lying along the curved collar and deformed to the curvature thereof.

11. An end cap assembly for a roller tube of a conveyor roller, comprising an annular housing formed as a moulding of polymeric material, a collar mounted on and surrounding said housing, the collar being of a size to be a sliding fit within an end of the roller tube and form a support therefor, and a bearing for rotatably mounting the assembly on a shaft, wherein the housing has an axially extending inner wall, an axially extending outer wall, and a plurality of webs spaced around said housing and extending between said inner and outer walls thereof so as to provide a substantially rigid structure to said housing, the outer surface of said outer wall being curved radially inwards in an axial direction of the housing over at least part of the length of said outer wall so that the housing has a larger diameter end and a smaller diameter end, the bearing is mounted as a force fit in the bore defined by said inner wall of the housing, and the collar has an inwardly projecting radial flange at one end thereof and an outwardly projecting radial flange at the other end thereof, said inwardly projecting radial flange on said collar being embedded in the larger diameter end of the housing during the moulding of the housing and the remainder of the collar being spaced radially from said curved outer wall of the housing and movable radially inwards against its own resilient resistance to deformation into abutting contact with said curved outer wall of the housing, whereby the end cap assembly may be firmly secured in an end of the roller tube by positioning the assembly in the tube with the outwardly projecting radial flange abutting the end of the tube and swaging the end of the tube radially inwards so as to force the collar against the rigid housing with at least part of the collar lying along the curved outer surface of the outer wall and deformed to the curvature thereof and the end portion of the roller tube lying along the curved collar and deformed to the curvature thereof.

* * * * *